United States Patent [19]

Swanstrom et al.

[11] Patent Number: 5,598,537
[45] Date of Patent: Jan. 28, 1997

[54] APPARATUS AND METHOD FOR DRIVING A BUS TO A DOCKING SAFE STATE IN A DOCKABLE COMPUTER SYSTEM INCLUDING A DOCKING STATION AND A PORTABLE COMPUTER

[75] Inventors: Scott Swanstrom, Cedar Park, Calif.; Douglas D. Gephardt, Austin, Tex.

[73] Assignee: Advanced Micro Devices, Inc., Sunnyvale, Calif.

[21] Appl. No.: 280,314

[22] Filed: Jul. 26, 1994

Related U.S. Application Data

[63] Continuation-in-part of Ser. No. 276,250, Jul. 18, 1994, which is a continuation-in-part of Ser. No. 255,663, Jun. 9, 1994, which is a continuation-in-part of Ser. No. 217,951, Mar. 25, 1994, abandoned.

[51] Int. Cl.$^6$ .............................. H05K 7/10; G06F 13/00
[52] U.S. Cl. .................. 395/281; 395/283; 364/708.1; 361/686
[58] Field of Search ............................ 395/308, 800, 395/500, 822, 200.2, 200.01, 281–283; 361/683, 686; 364/708.1

[56] References Cited

U.S. PATENT DOCUMENTS

| | | | |
|---|---|---|---|
| 4,530,069 | 7/1985 | Desrochers | 364/900 |
| 4,769,764 | 9/1988 | Levanon | 364/708 |
| 4,969,830 | 11/1990 | Daly et al. | 439/136 |
| 5,030,128 | 7/1991 | Herron et al. | 439/372 |
| 5,052,943 | 10/1991 | Davis | 439/357 |
| 5,126,954 | 6/1992 | Morita | 364/708 |
| 5,175,671 | 12/1992 | Sasaki | 361/392 |
| 5,187,645 | 2/1993 | Spalding et al. | 361/393 |
| 5,195,183 | 3/1993 | Miller et al. | 395/275 |
| 5,241,542 | 8/1993 | Natarajan et al. | 370/95.3 |
| 5,265,238 | 11/1993 | Canova, Jr. et al. | 395/500 |
| 5,323,291 | 6/1994 | Boyle et al. | 361/683 |
| 5,331,509 | 7/1994 | Kikimis | 361/686 |
| 5,396,400 | 3/1995 | Register et al. | 361/686 |
| 5,450,271 | 9/1995 | Fukushima et al. | 361/686 |
| 5,457,785 | 10/1995 | Kikimis et al. | 395/308 |
| 5,463,742 | 10/1995 | Kobayashi | 395/281 |
| 5,477,415 | 12/1995 | Mitcham et al. | 361/686 |
| 5,488,572 | 1/1996 | Belmont | 364/514 R |
| 5,526,493 | 6/1996 | Shu | 395/281 |

FOREIGN PATENT DOCUMENTS

| | | |
|---|---|---|
| 0426134 | 5/1991 | European Pat. Off. . |
| 0637793 | 2/1995 | European Pat. Off. . |
| WO9209026 | 5/1992 | WIPO . |

OTHER PUBLICATIONS

IBM Technical Disclosure Bulletin, vol. 29, No. 7, Dec. 1986, pp. 2877–2878.
IBM Technical Disclosure Bulletin, vol. 35, No. 5, Oct. 1992, pp. 391–394.
HPSIR, Special Infrared Communications Specification, introduction pages and pp. 1–9.

*Primary Examiner*—Gopal C. Ray
*Attorney, Agent, or Firm*—Foley & Lardner

[57] ABSTRACT

In a dockable computer system capable of hot docking or warm docking, a docking safe circuit drives the bus of the portable computer and docking station to a docking safe state in response to a DOCK signal. The DOCK signal may be a notice signal indicative of a change of state from the undocked state to the docked state or from the docked state to the undocked state. The notice signal may be provided from software, a user-actuated switch or an infrared signal. Preferably, the docking safe state or dockable state is a state in which: the ground conductors of the buses are referenced to a common ground potential; the buses are "quiet" or non-transitioning; the bidirectional terminals on the bus of the portable computer are set to an output state; the bidirectional terminals of the bus of the docking station are set to an input state; and the signaling levels of the buses have the same voltage potential. Preferably, the present invention is implemented on a peripheral component interconnect (PCI) bus.

20 Claims, 6 Drawing Sheets

APPARATUS AND METHOD FOR DRIVING A BUS TO A DOCKING SAFE STATE IN A DOCKABLE COMPUTER SYSTEM INCLUDING A DOCKING STATION AND A PORTABLE COMPUTER

CROSS REFERENCE TO RELATED APPLICATIONS

The present application is a continuation-in-part application of copending U.S. patent application Ser. No. 08/276,250, filed Jul. 18, 1994, entitled, "Dockable Computer System Capable of Symmetric Multi Processing Operations," which is a continuation-in-part application of copending U.S. patent application Ser. No. 08/255,663 filed Jun. 9, 1994, entitled "An Apparatus and Method for Granting Control of a Bus in a Computer System," which is a continuation-in-part application Ser. No. 08/217,951, entitled "A Method and Apparatus for Achieving Hot Docking Capabilities for a Dockable Computer System," filed Mar. 25, 1994, abandoned in favor of co-pending continuation U.S. application Ser. No. 08/553,109, filed Nov. 7, 1995 all assigned to the assignee of the present invention. The present application is also related to U.S. patent application Ser. No. 08/217,952, filed Mar. 25, 1994, entitled "A Dockable Computer System Capable of Electric and Electromagnetic Communication," which is likewise assigned to the assignee of the present invention.

TECHNICAL FIELD

The present invention relates generally to a dockable computer system in which a portable computer is associated with a stationary host computer through a resident station and, more particularly, to a system and method for implementing the system in a manner enabling the portable computer and resident station to be physically combined or separated when the units are powered on.

BACKGROUND OF THE INVENTION

A dockable computer system includes a portable computer unit, usually a notebook or laptop, and a stationary or base computer unit having a docking station for receiving the portable computer unit. Dockable computer systems may be operated in a docked state, in which both computer units are physically associated as a generally unified system, or the remote unit may be separated from its host for independent operation in an undocked state.

Rudimentary docking systems of the foregoing variety have been designed in an effort to meet the needs of today's mobile computer users for "ubiquitous" computing system capabilities, to fulfill their computing needs in diverse aspects of their professional and personal lives and in sundry locations. Contemporary dockable computer systems approach this problem through a single system having a detachable mobile computing component or subsystem.

The expandable desktop computer provides greater storage resources, network connectivity, larger displays, and other superior facilities which are necessary for the typical range of generally demanding home and office computing. The portable computer (mobile computer unit) allows the user to have computing capabilities while outside the home or office by detaching that component with its indigenous hardware and resident software. The computing capabilities of the portable computer are somewhat limited due to size, weight and power constraints but represent the best available approach in these embryonic attempts to balance portable mobility needs.

When the user leaves the host environment of home or office, the portable computer is undocked (that is, physically detached) from the docking station of the stationary computer unit. Applications, files, and other data needed for the mobile computing task must have previously been stored in the portable computer. When the user returns to the host environment, the portable computer is reunited (docked) with the docking station so the applications, the files and other data are stored and maintained in a single location. Thus, the use of a dockable computer system allows the user to have access to any needed applications, files and other data just before embarking on the mobile computing task.

When the dockable computer system changes from the undocked state to the docked state or the docked state to the undocked state (a docking event), protective measures are required to prevent catastrophic failures caused by physically connecting or disconnecting the active buses of the portable computer and the docking station. For example, the bus of the portable computer can be referenced to a substantially different ground level or signal level than the bus of the docking station. Connecting these buses can cause large inrushes of current, especially through the ground conductors, and signal overdrive conditions. Large inrushes of current and signal overdrive conditions may cause component damage and excessive battery wear or deterioration. Also, bidirectional terminals on the portable computer and bidirectional terminals on the docking station may be inappropriately set to both be in an input state or to both be in an output state. Such a situation can cause input leakages (resulting in excessive battery wear) and signaling failures.

Contemporary dockable computer systems are typically "cold docking" systems which protect the buses only by powering off the portable computer and docking station, rendering the buses inactive so protective measures are not required. These "cold docking" systems are disadvantageous because the user must wait for the dockable computer system to be turned on, rebooted, and reconfigured before the dockable computer system is operational in the docked state. These systems are inconvenient because of the amount of time required to change from the docked state to the undocked state or from the undocked state to the docked state.

There is a need for a "hot docking" computer system and a "warm docking" computer system. A "hot docking" computer system as envisioned herein is a dockable computer system which can change states with the portable computer running at full power. A "warm docking" system may be thought of as a dockable computer system which can change when the portable computer is in a reduced power state when the portable computer is not running at full power. Examples of the reduced power state are the suspend state and standby state now incorporated in some microprocessor systems. Hot docking and warm docking systems advantageously enable the user to more immediately begin computer tasks because the systems are powered on throughout the docking event.

Thus, there is a need for a dockable computer system which includes circuitry that allows the dockable computer system to change states while powered on. More particularly, there is a need for a dockable computer system which drives the active buses of the portable computer and docking station to a dockable state or a docking safe state when the system is docked or undocked.

SUMMARY OF THE INVENTION

The present invention relates to a portable computer for use in a dockable computer system capable of assuming at least two states, a docked state and an undocked state, with a host station. The dockable computer system is in the docked state when the portable computer is operatively associated with the host station and is in the undocked state when the portable computer is physically separate from the host station. The dockable computer system includes a computer bus, a docking safe circuit, and a dock circuit. The docking safe circuit communicates with the computer bus and includes a dock input. The dock safe circuit drives the computer bus to a docking safe state in response to a DOCK signal on the dock input. The dock circuit communicates with the dock safe circuit and provides the DOCK signal in response to the dockable computer system changing states.

The present invention also relates to a method of docking or undocking a portable computer and a host station of a dockable computer system. The portable computer has a computer bus, and the host station has a host bus. The dockable computer system includes a dock circuit for generating a DOCK signal in response to docking or undocking the portable computer. The computer bus is physically electrically coupled with the host bus when the portable computer is docked with the host station. The method includes the steps of receiving the DOCK signal provided by the dock circuit, driving the computer bus to a docking safe state in response to the DOCK signal, and coupling or uncoupling the host bus and the computer bus.

The present invention further relates to a portable computer operable in an undocked state or a docked state with a station having a station bus. The computer includes a bus and a computer connector coupled to the bus, and the station includes a station connector coupled to the station bus. The computer connector is coupled to the station connector when the computer is operable in the docked state, and the computer connector is separate from the station connector when the computer is operable in the undocked state. The computer includes a CPU and a bus isolation circuit. The CPU is capable of physical electrical communication with the bus of the computer. The bus isolation circuit is coupled between the bus of the computer and the computer connector. The bus isolation circuit isolates the bus of the computer when the computer changes states.

The present invention still further relates to an improved dockable computer system including a host computer station having a station bus and a mobile computer unit having a unit bus. The dockable computer system is capable of residing in at least two distinct states, a docked state in which the unit is operatively associated with the station, and an undocked state in which the unit is physically separate from the station. The improvement includes a docking safe circuit coupled to the unit bus. The docking safe circuit drives the unit bus to a docking safe state when the system changes from the undocked state to the docked state or from the docked state to the undocked state.

In one aspect of the present invention, a docking agent quiets the bus of the portable computer. Signal keepers within the portable computer force bidirectional terminals to the output state to drive the bus to a docking safe state. In another aspect of the present invention, a bus isolation circuit drives a pin boundary between the portable computer and docking station to an electrically benign state and forces the system bus to a quiet state. After these two states or other docking safe states are reached, the bus isolation circuit allows communication between the portable computer and docking station. The bus isolation circuit is preferably an in-line device which isolates and protects the bus of the portable computer as the portable computer is docked or undocked.

In yet another aspect of the present invention, the docking safe state is a bus state characterized by the following conditions: the ground signal levels in the host station and portable computer are referenced to a common ground potential, the signals on the buses are not transitioning or "quiet" the bidirectional terminals of the portable computer are set to an output state, the bidirectional terminals of the host station are set to an input state, and the logic high (Vcc) signal levels of the portable computer and host station have equal voltage potentials. Alternatively, the docking safe state can include only one or more of the foregoing conditions.

The docking safe state advantageously reduces the potential for electrostatic discharge (ESD) between the portable computer and the docking station and prevents unnecessary signal overdrive and input leakage, thereby extending the life of the battery associated with the portable computer. The docking safe state also effectively reduces the potential for signaling failures and component malfunction caused by the docking event.

BRIEF DESCRIPTION OF THE DRAWINGS

The invention will hereafter be described with reference to the accompanying drawings, wherein like numerals denote like elements, and.

DETAILED DESCRIPTION OF THE PREFERRED EXEMPLARY EMBODIMENTS

Figure 1:
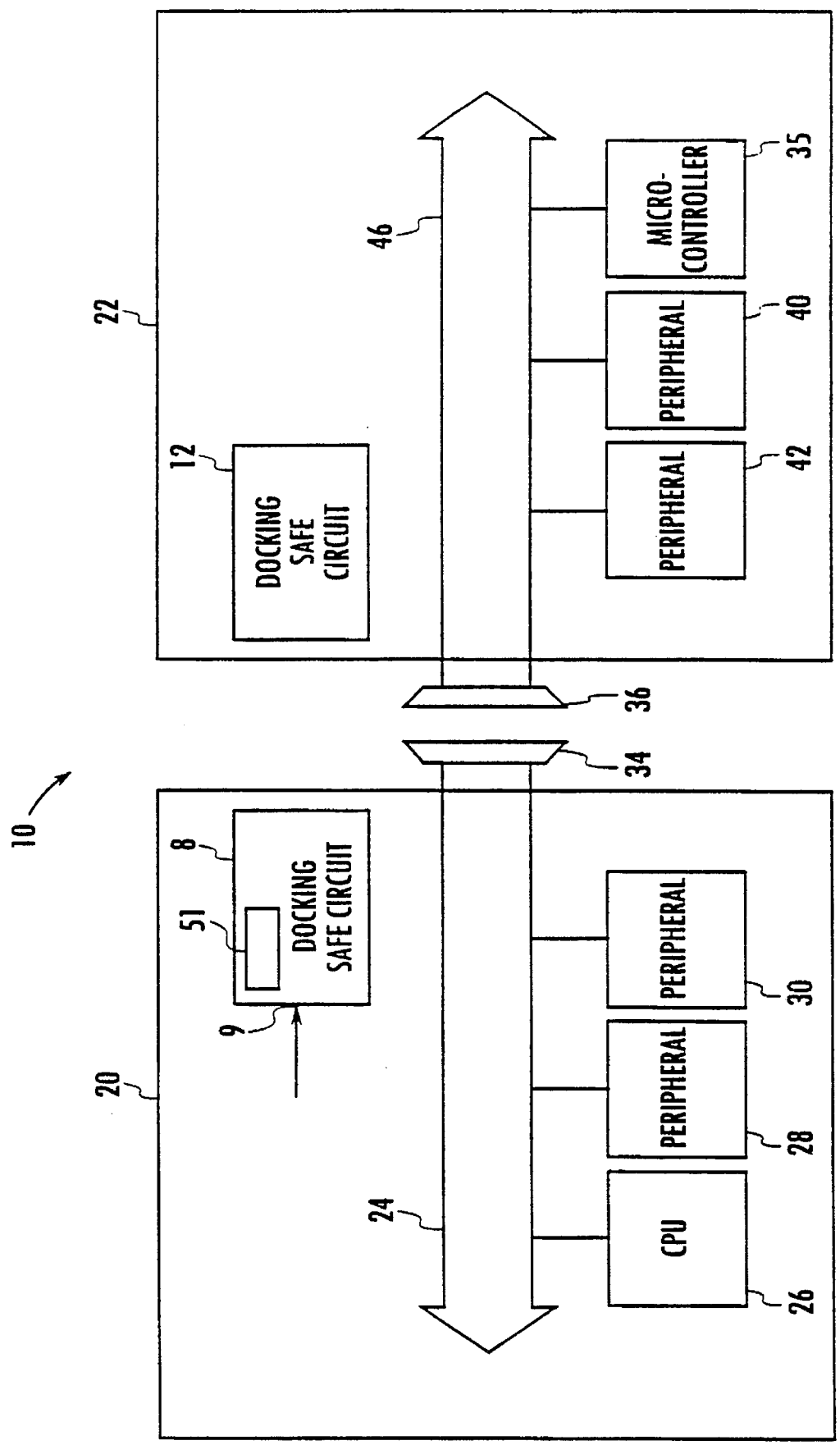
FIG. 1 schematically illustrates a dockable computer system employing an exemplary embodiment of the present invention.

FIG. 1 is a schematic block diagram of a dockable computer system 10 including a portable computer 20 and a docking or host station 22. Portable computer 20 is a mobile computer unit including a CPU 26, a system bus 24, and a docking safe circuit 8. Portable computer 20 can also include a peripheral device 28 and a peripheral device 30.

System bus 24 couples CPU 26, peripheral device 28, and peripheral device 30. An external connector 34 is also coupled with system bus 24. System bus 24 can be a CPU-to-memory bus, an I/O bus, a standard bus, PCI bus, a sub-bus, a span bus or any other type of bus functionally operative in the microcomputer environment. Alternatively, components of computer system 10 can be coupled together via bridges, sub-buses and other conductors (not shown), and CPU 26 can be coupled to bus 24 via a host/PCI bus bridge (not shown).

Docking station 22 includes a docking safe circuit 12. Docking station 22 can also include a microcontroller 35, a peripheral device 40 and a peripheral device 42. Microcontroller 35 can be replaced by a more powerful microprocessor as warranted by applications for system 10, and it is within the scope of the present invention to utilize a minicomputer as the host system should the user so desire. Docking station 22 is a host station which can have superior, equal or inferior computing power compared to portable computer 20, depending on design needs, requirements or constraints.

Docking bus 46 couples microcontroller 35, peripheral device 40 and peripheral device 42. An external connector 36 is also coupled to docking bus 46. Docking bus 46 can be a host-to-memory bus, an I/O bus, a standard bus, a PCI bus, a sub-bus, a span bus or any other type of bus as noted generally above. Docking bus 46 can also be coupled to docking safe circuit 12.

When dockable computer system 10 is in an undocked state, external connectors 34 and 36 are not physically coupled. Therefore, in the undocked state, system bus 24 and docking bus 46 are not in physical, electrical communication. In this undocked state, portable computer 20 is operable as a stand-alone computer and is physically separate from docking station 22.

In the docked state, docking station 22 receives portable computer 20 so dockable computer system 10 operates as a single desktop computer or an integrated computer system. When dockable computer system 10 is in this docked state, external connectors 34 and 36 are physically coupled. With connectors 34 and 36 coupled, CPU 26 can electrically communicate with components in docking station 22 such as peripheral device 42, peripheral device 40, or microcontroller 35 via system bus 24, connectors 34 and 36, and docking bus 46.

Docking safe circuit 8 can be disposed intermediate external connector 34 and system bus 24 as an in-line device or coupled to system bus 24 as an off-line device. Docking safe circuit 8 includes a DOCK input 9 for receiving a DOCK signal. The DOCK signal is preferably provided by dockable computer system 10 prior to or during a docking event. The DOCK signal indicates that docking safe circuit 8 should take appropriate action to protect system bus 24 as it is coupled to or uncoupled from docking bus 46. The operation of docking safe circuit 8 in dockable computer system 10 is described below with reference to FIGS. 1 and 6.

Figure 6:
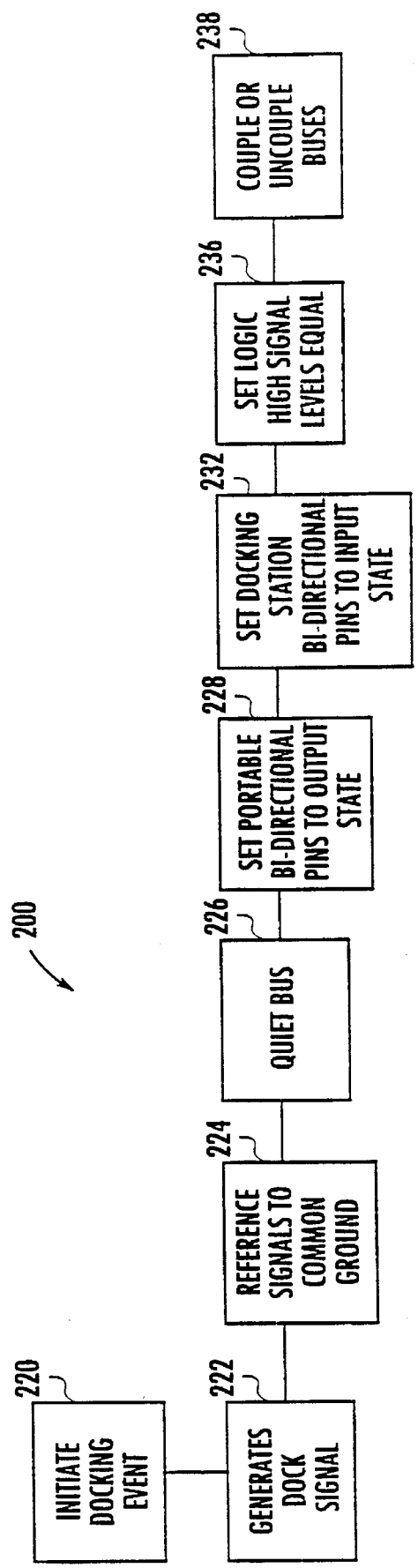
FIG. 6 is a simplified flow chart of the operation of the dockable computer system illustrated in FIG. 1 during a docking event.

Referring to FIG. 6, a docking event 200 begins when a user of system 10 or an automatic ejection or insertion mechanism (not shown) initiates the coupling or uncoupling of connectors 34 and 36 (at block 220). Dockable computer system 10 preferably includes a docking event sense circuit or other monitoring device which senses the impending docking event 200 and generates a DOCK signal (at block 222). The DOCK signal is a warning that buses 24 and 46 are about to be coupled or uncoupled. The DOCK signal is received at dock input 9 of docking safe circuit 8. Docking safe circuit 8 drives system bus 24 to a docking safe state in response to the DOCK signal.

System and application parameters typically define the docking safe state and therefore the precautions necessary to adequately protect system bus 24 and docking bus 46 during docking event 200. For instance, the docking safe state should be a state in which buses 24 and 46 can be coupled or uncoupled with minimal signaling failures, current discharge and component damage. In one preferred embodiment, the docking safe state is an electrically benign state or a state where: the ground conductors of buses 24 and 46 are referenced to a common ground potential; the signal levels on buses 24 and 46 are not transitioning or "quiet"; the bidirectional terminals of bus 24 are set to an output state; the bidirectional terminals of bus 46 are set to an input state; and the signaling levels on buses 24 and 46 have equal potentials. The protective measures associated with the docking safe state should also be balanced with practical considerations such as the amount of time required to place buses 24 and 46 in the docking safe state. Preferably, the docking safe state should be reached within 0.5 seconds so the user is not subjected to a perceptible delay as system 10 changes states. Alternatively, buses 24 and 46 can be designed with inherent translation, isolation, and protection features, thereby eliminating the need for certain aspects of the docking safe state. In this sense, therefore, the docking safe state is system defined and may be manifested in a variety of protective measures for buses 24 and 46. Thus, docking safe circuit 8 drives system bus 24 to a docking safe state so buses 24 and 46 may be safely coupled or uncoupled when portable computer 20 and docking station 22 are powered ON.

With reference to FIG. 6, docking safe circuit 8 references all ground conductors on system bus 24 and docking bus 46 to a common ground (block 224). Docking safe circuit 8 can utilize a ground connection interface (not shown) such as ground pins or a shield conductor associated with connectors 34 and 36 to ensure that buses 24 and 46 have the same ground potential. Portable computer 20 generally has a "floating" ground level which can be referenced to the ground level of docking station 22 when connectors 34 and 35 are coupled. The ground level of docking station 22 is advantageously referenced to 0 VDC.

Docking safe circuit 8 also quiets or renders inactive system bus 24 in response to the DOCK signal (block 226). Docking safe circuit 8 may utilize similar techniques to those discussed in U.S. patent application Ser. No. 08/217,951, filed Mar. 25, 1994, entitled "An Apparatus and Method for Generating Hot Docking Capabilities for a Dockable Computer System," for quieting signals on system bus 24. Similarly, docking safe circuit 12 may utilize the same techniques to quiet docking bus 46.

Docking safe circuit 8 also sets all bidirectional terminals on bus 24 to the output state (block 228). Preferably, a signal keeper circuit 51 drives the bidirectional terminals to the output state. Signal keeper circuit 51 is preferably comprised of low current back-to-back inverters which maintain the current pin status on bus 24. The inverters are easily overdriven by other components such as CPU 26 and peripheral devices 28 and 30 coupled to bus 24. The inverters are also designed to use as little battery power as possible and yet reliably drive the bidirectional terminals to the output state.

Docking safe circuit 12 sets all bidirectional terminals on docking bus 46 to the input state (block 232). Preferably, components on bus 46 such as peripheral devices 40 and 42 have a default state which sets the bidirectional terminals to the input state. Alternatively, microcontroller 35 may set peripheral devices 40 and 42 in a reset state so that the bidirectional terminals are set to the input state.

Docking safe circuit 8 also sets the logic high signal levels (VCC) in portable computer 20 and docking station 22 to the same voltage level (block 236). Preferably, docking station 22 includes components such as peripheral devices 40 and 42 which may operate at either a 3.3 VDC or 5.0 VDC signal level, and docking safe circuit 8 or docking safe circuit 12 set the logic high signal level of components of docking station 22 to the logic high signal level of portable computer 20. Generally, portable computer 20 has a 3.3 VDC logic high signal level. Alternatively, docking safe circuit 8 or docking safe circuit 12 may isolate buses 24 and 46 and include voltage translation circuitry for converting the logic high voltage level of portable computer 20 or docking station 22 to a compatible level.

After system bus 24 and docking bus 46 reach the docking safe state (blocks 224–236), buses 24 and 46 can be coupled or uncoupled safely (block 238). Thus, docking safe circuit 8 drives system bus 12 to a docking safe state, thereby protecting bus 24 during docking event 200.

Figure 2:
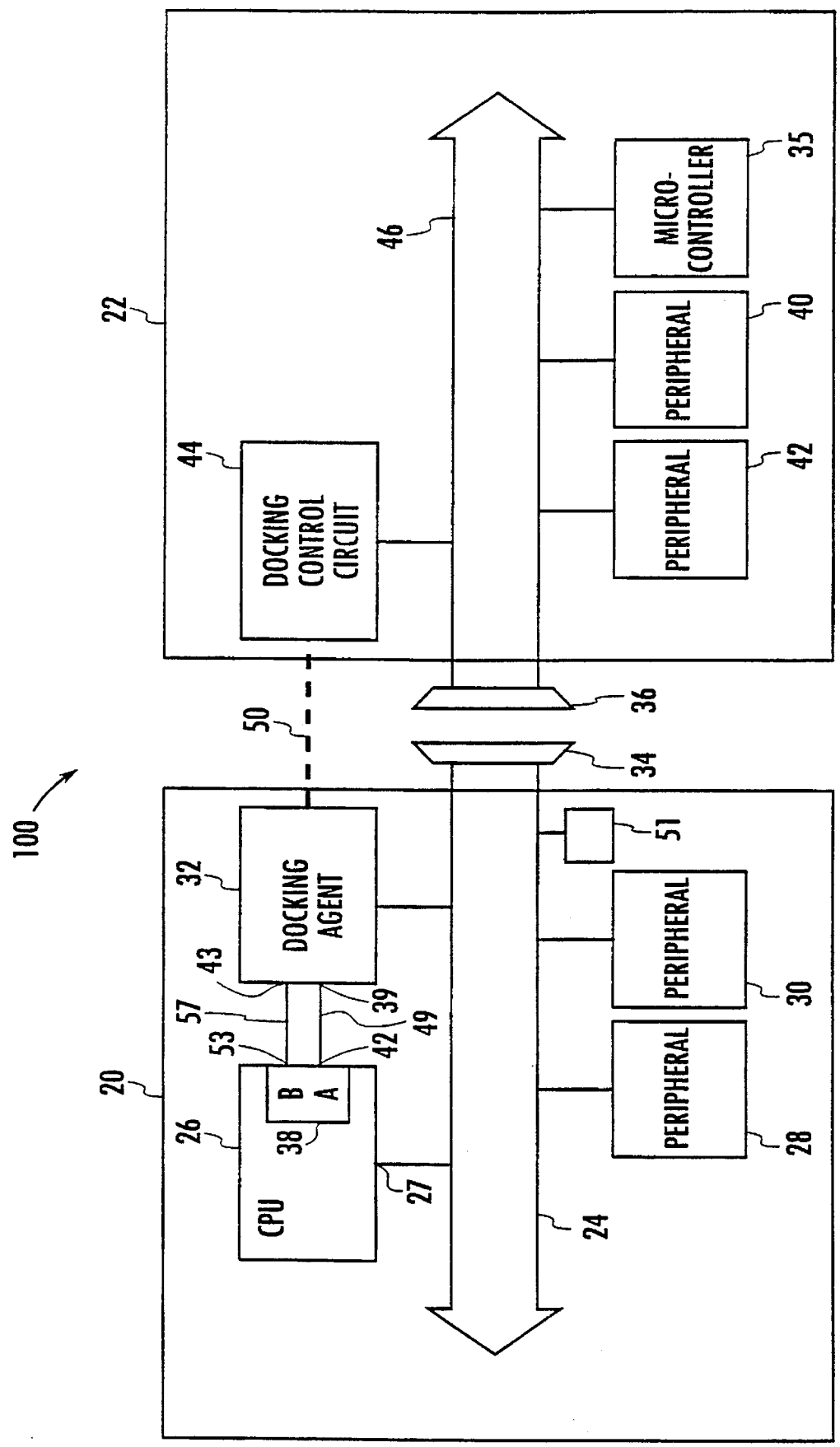
FIG. 2 is a more detailed schematic diagram of the dockable computer system illustrated in FIG. 1 in accordance with a first exemplary architecture.

Portable computer 20 and docking station 22 of a dockable computer system 100 illustrated in FIG. 2 are similar to dockable computer system 10 discussed with reference to FIG. 1. System 100 generally includes a bus arbiter 38 integrated with CPU 26, a docking agent 32 and a docking control circuit 44. The operations of docking safe circuit 8 and docking safe circuit 12 are performed by docking agent 32 and docking control circuit 44, respectively. Docking agent 32 is coupled to system bus 24 as an off-line device; docking control circuit 44 is coupled to docking bus 46 as an off-line device.

Dockable computer system 100 preferably provides the DOCK signal as an ADVANCE NOTICE signal warning of the impending docking event. Preferably, docking control circuit 44 includes circuitry for sensing an impending docking event and for communicating the ADVANCE NOTICE signal across a communication link 50, as described below.

The ADVANCE NOTICE signal can be provided on system bus 24, docking bus 46, communication link 50, or various control lines in dockable computer system 10. For example, when dockable computer system 10 changes from an undocked state to a docked state (an external event), communication link 50 preferably provides an infrared ADVANCE NOTICE (warning) signal which is received by docking agent 32. Communication link 50 can be an electromagnetic communication link, long pin interface, or wireless communication link such as those disclosed in U.S. patent application Ser. No. 08/217,952, filed Mar. 25, 1994, and entitled, "Dockable Computer System Capable of Electric and Electromagnetic Communication", assigned to the assignee of the present invention. Portable computer 20 or docking station 22 can provide a software-actuated ADVANCE NOTICE signal or a user-actuated ADVANCE NOTICE signal.

Bus arbiter 38 includes a quiet request input 53 coupled to a quiet request control line 57 and a quiet acknowledge output 42 coupled to a quiet acknowledge control line 49. CPU 26 is able to monitor bus activity on bus 24 via a bus input 27. Bus input 27 preferably includes control lines for receiving signals such as a FRAME signal and an IRDY (Initiator Ready) signal utilized by the PCI protocol which indicate a transaction is occurring on bus 24. Docking agent 32 includes a quiet acknowledge input 39 coupled to quiet acknowledge control line 49, and a quiet request output 43 coupled to quiet request control line 57.

Bus arbiter 38 is advantageously integrated with CPU 26 so bus arbiter 38 is capable of disconnecting current bus cycles by providing an idle, stop, halt or other bus cycle control command to CPU 26 and peripheral devices 28 and 30. Alternatively, bus arbiter 38 may signal CPU 26 or a bus bridge (not shown) to disconnect the current bus cycle. Bus arbiter 38 can also be integrated with other components such as a host or PCI bus bridge (not shown). Bus arbiter 38 is designed along the lines and performs the operations of that circuitry described in U.S. patent application Ser. No. 08/255,663, filed Jun. 9, 1994, entitled "An Apparatus and Method for Granting Control of a Bus in a Computer System."

Docking agent 32 ensures that system bus 24 is in the docking safe state. More particularly, docking agent 32 cooperates with bus arbiter 48 to quiet or render inactive system bus 24 in response to the DOCK signal. Docking agent 32 provides a QUIET REQUEST (primary request) signal on QUIET REQUEST control line 57 in response to the DOCK signal. Arbiter 38 receives the QUIET REQUEST signal and de-asserts all grants given to other bus masters such as CPU 26 and peripheral devices 28 and 30. After the current transaction on bus 24 is completed, arbiter 38 grants bus ownership to docking agent 32 by providing a QUIET ACKNOWLEDGE (primary knowledge) signal across QUIET ACKNOWLEDGE control line 49. Preferably, arbiter 38 grant docking agent 32 a time-bound access to system bus 24. Docking agent 32 quiets system bus 24 in response to the QUIET ACKNOWLEDGE signal.

Docking agent 32 also employs signal keeper circuit 51 within portable computer 20, or other weak driving entities, to maintain the current pin status on system bus 24. Maintaining the current pin status inherently sets all bidirectional terminals on system bus 24 to the output state. Docking agent 32 is preferably designed along the lines and performs the operations of that circuitry described in U.S. patent application Ser. No. 08/217,951, filed Mar. 25, 1994, entitled "An Apparatus and Method for Achieving Hot Docking Capabilities for a Dockable Computer System."

Figure 3:
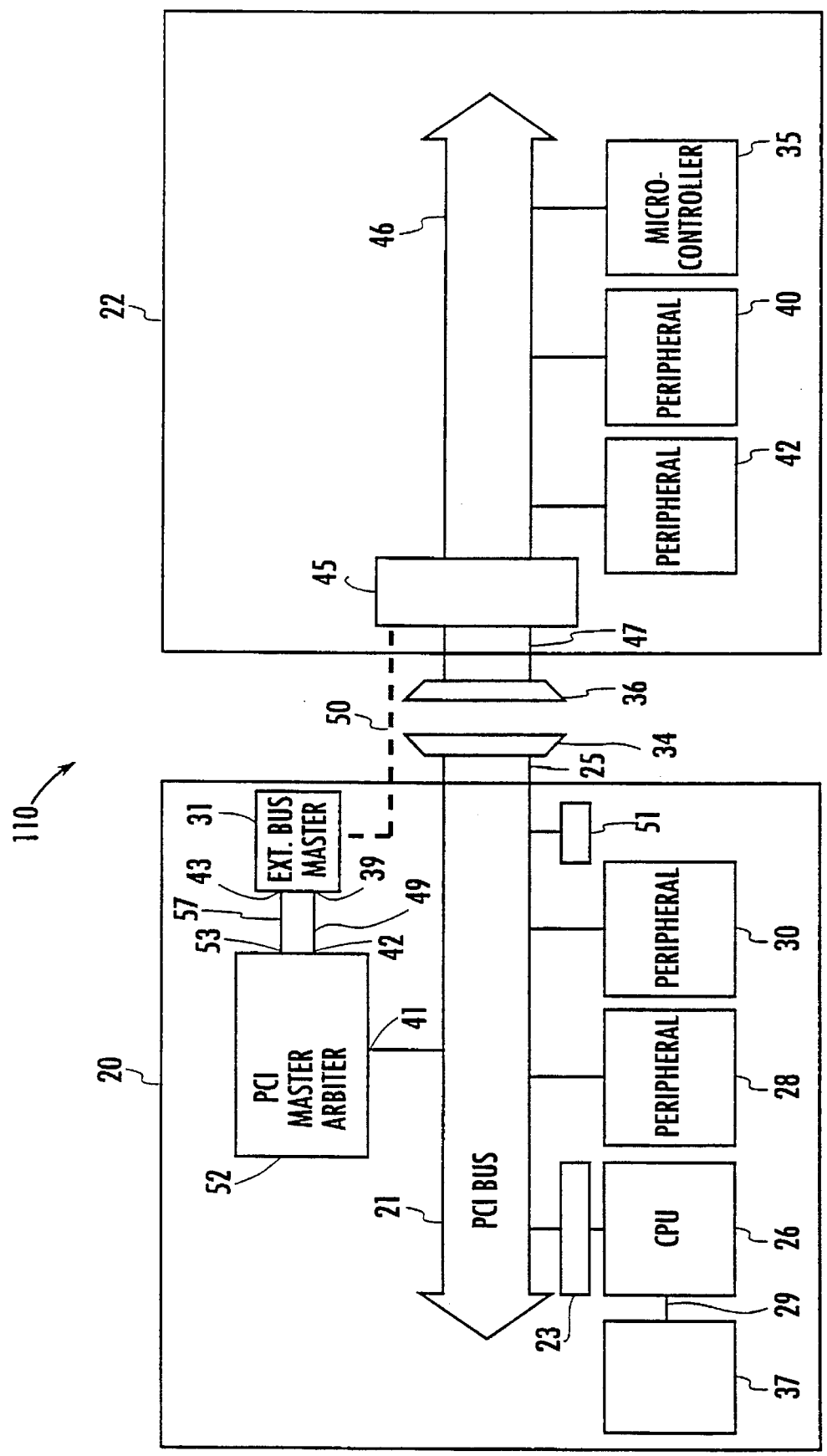
FIG. 3 is a more detailed block diagram of the dockable computer system illustrated in FIG. 2 in accordance with a second exemplary architecture.

Portable computer 20 and docking station 22 of a dockable computer system 110 illustrated in FIG. 3 are similar to dockable computer system 10 discussed with reference to FIG. 1. Dockable computer system 110 includes a PCI bus 21, a PCI master arbiter 52, an external bus master 31, a host-to-PCI bridge 23, a docking control circuit 45 and a memory 37. CPU 26 is coupled to memory 37 via a high speed bus 29. CPU 26 is coupled to PCI bus 21 through host-to-PCI bus bridge 23. External bus master 31 and signal keepers 51 operate similarly to docking safe circuit 8 (FIG. 1), and drive PCI bus 21 to a docking safe state. Docking control circuit 45 is coupled as an in-line device between a connector bus 47 and bus 46.

In operation, external bus master 31 provides a QUIET REQUEST (primary request) signal on quiet request control line 57 in response to receiving the DOCK signal on communication link 50. PCI master arbiter 52 receives the QUIET REQUEST signal and de-asserts all grants given to other bus masters such as peripheral devices 28 and 30. After the current transaction on PCI bus 21 is completed, PCI master arbiter 52 grants bus ownership to external bus master 31 by providing a QUIET ACKNOWLEDGE (primary acknowledge) signal across quiet acknowledge control line 49, thereby quieting system bus 24. Preferably, PCI master arbiter 52 grants a time bound access to bus master 31. External bus master 31 is thus able to quiet PCI bus 21 in response to the DOCK signal.

Central resource keepers in signal keeper circuit 51 preferably maintain the current signaling level of conductors on PCI bus 21 and drive the bidirectional terminals on bus 21 to the output state. Signal keeper circuit 51 may be integrated within PCI master arbiter 52, host-to-PCI bridge 23, or other device coupled to PCI bus 21. The central resource keepers are weak driving entities for retaining the signals on PCI bus 21; weak driving entities may be easily overdriven by other devices on PCI bus 21 so that they do not interfere with normal operations of bus 21.

Docking station 22 includes a docking control circuit 45 shown to be an in-line device. Docking control circuit 45 can perform the operations of docking safe circuit 12 (FIG. 1) and drive docking bus 46 to a docking safe state. Docking control circuit 45 sets the states of the bidirectional terminals on docking bus 46 to an input state by holding peripheral devices 40 and 42 in a reset state. According to PCI protocol, the reset state forces all bidirectional terminals to the input state.

Alternatively, docking control circuit 45 can drive connector bus 47 to an electrically benign state so connectors 34 and 35 may be safely coupled or uncoupled. The electrically benign state is a docking safe state in which connector bus 47 is essentially powered off. Docking control circuit 45 can drive connector bus 47 to the electrically benign state by driving tri-state terminals on bus 47 to the high impedance state. Active signals do not exist on bus 47 when it is in the electrically benign state. For this type of docking safe state, buses 21 and 46 are preferably quieted before allowing communication across docking control circuit 45 so signaling errors are prevented.

Figure 4:
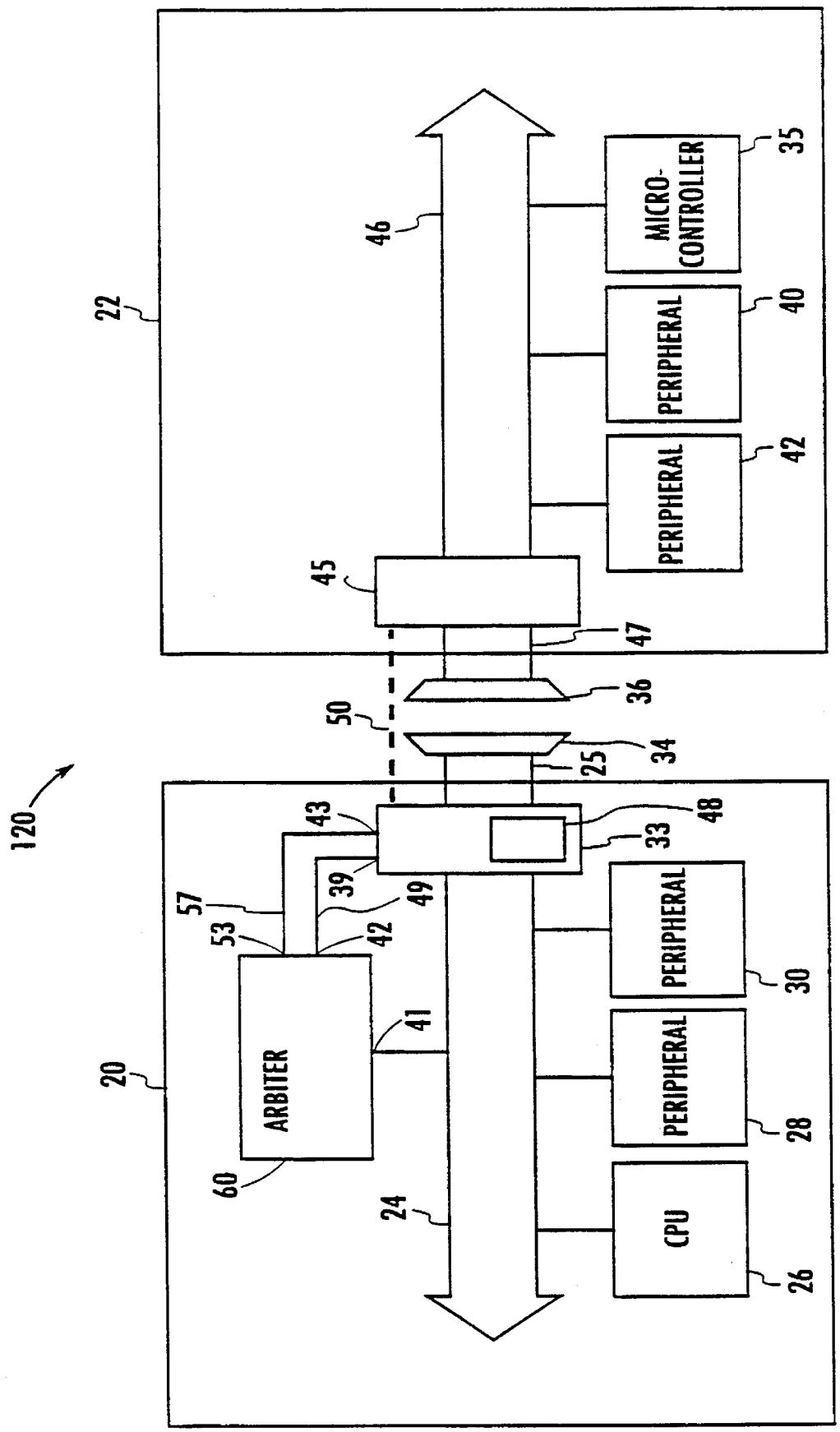
FIG. 4 is a more detailed block diagram of the dockable computer system illustrated in FIG. 1 in accordance with a third exemplary architecture.

Portable computer 20 and docking station 22 of a dockable computer system 120 illustrated in FIG. 4 operate similarly to dockable computer system 10 discussed with reference to FIG. 1. However, dockable computer system 120 in FIG. 4 includes a buffer circuit or a docking bridge 33 and docking control circuit 45, shown to be in-line devices, and a bus arbiter 52 shown to be a stand-alone, off-line device. Docking agent 32 and docking control circuit 44 (FIG. 2) may be utilized with a bus arbiter 60. Alternately, bus arbiter 60 may be integrated with CPU 26.

Docking bridge 33 is coupled between system bus 24 and a connector bus 25 and includes a signal keeper circuit 48. Docking bridge 33 and docking control circuit 45 provide the functions of docking safe circuit 8 and docking safe circuit 12 (FIG. 1), respectively. Connector bus 25 is preferably coupled to external connector 34 and connector bus 47 is preferably coupled to external connector 36. When system 120 is about to change states, docking bridge 33 drives connector bus 25 to the electrically benign state and docking control circuit 45 drives connector bus 47 to the electrically benign state.

After connector buses 25 and 47 are in the electrically benign state, docking bridge 33 and docking control circuit 45 can additionally quiet system bus 24 and docking bus 46 to ensure incomplete bus cycles or signals are not transmitted on buses 24 and 46. After buses 25 and 47 are in the electrical benign state, connectors 34 and 36 can be coupled. Once connectors 34 and 36 are coupled and buses 24 and 46 are quieted, docking bridge 33 and docking control circuit 45 allow communication between buses 24 and 46.

Docking bridge 33 and docking control circuit 45 operate as in-line devices and can isolate connector bus 25 from system bus 24 and connector bus 47 from docking bus 46. Docking bridge 33 and docking control circuit 45 preferably include filter capability, drive capability, voltage level translation capability and buffering capability. Buffering capability can include tri-state inputs and outputs for isolating buses 24 and 46 by utilizing a high impedance state. Docking bridge 33 and docking control circuit 45 are discussed in more detail in U.S. patent application Ser. No. 08/217,951, filed Mar. 25, 1994, entitled "An Apparatus and Method for Achieving Hot Docking Capabilities for a Dockable Computer System."

Figure 5:
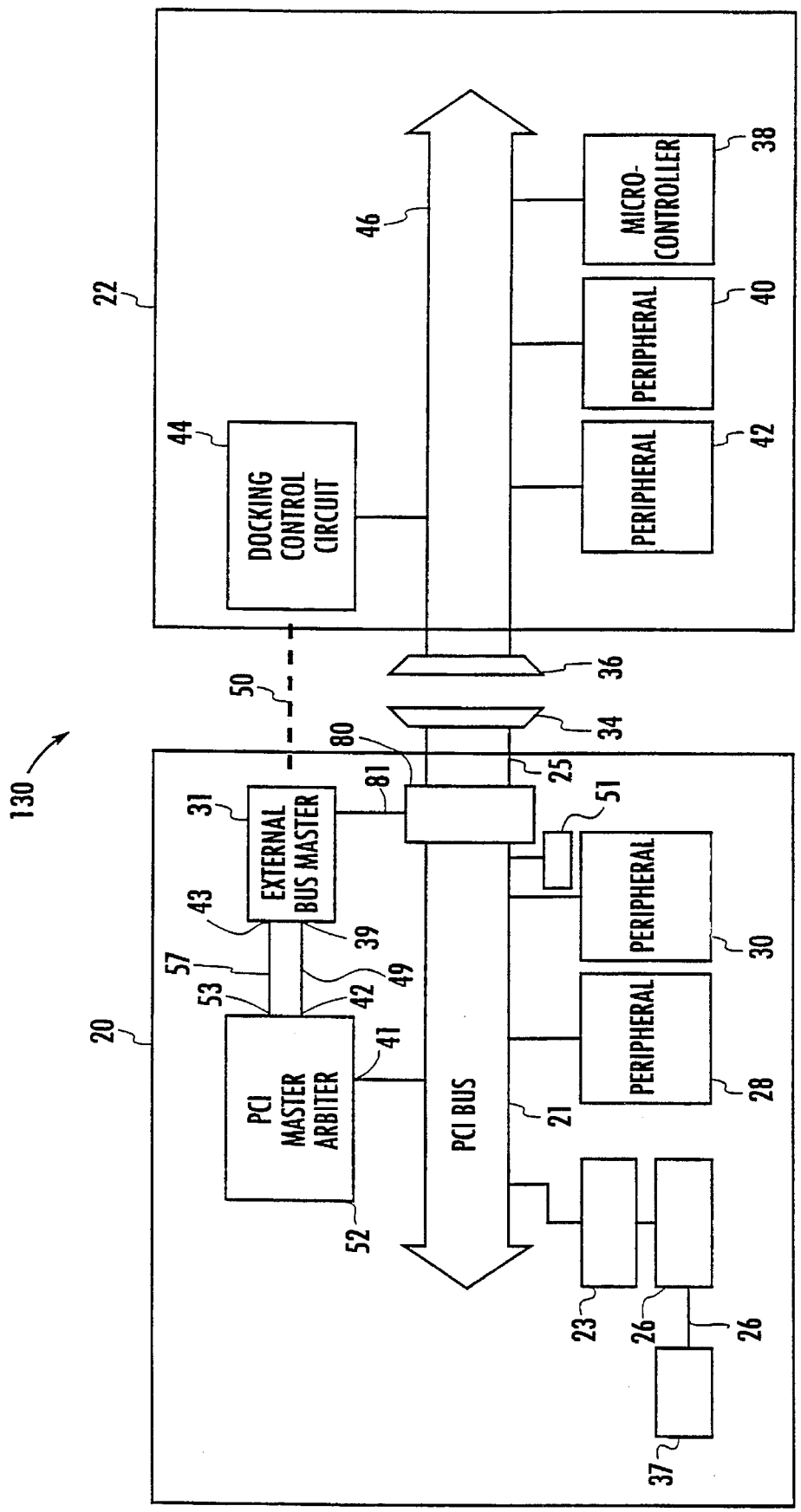
FIG. 5 is a more detailed block diagram of the dockable computer system illustrated in FIG. 1 in accordance with a fourth exemplary architecture.

Portable computer 20 and docking station 22 of dockable computer system 130 illustrated in FIG. 5 are similar to dockable computer system 110 discussed with reference to FIGS. 3 and 4. Dockable computer system 130 includes a buffer circuit or a docking bridge 80 coupled to PCI bus 21. Docking bridge 80, external bus master 31 and PCI master arbiter 52 cooperate to perform the operations of docking safe circuit 8 (FIG. 1). Docking bridge 80 is an in-line PCI-to-PCI bridge disposed electrically intermediate connector bus 25 and PCI bus 21.

Docking bridge 80 ensures connector bus 25 is in an electrically benign state in response to the DOCK signal. Docking bridge 80 also provides a signal on a conductor 81 so that external bus master 31 requests control of bus 21 by providing a QUIET REQUEST across QUIET REQUEST control line 57. PCI master arbiter 52 grants control of bus 21 to external bus master 31 so PCI bus 21 may be quieted. External bus master 31 does not necessarily need a time-bound access because docking bridge 80 advantageously holds connector bus 25 in the electrically benign state until bus 21 is quieted.

Preferably, PCI master arbiter can monitor PCI bus 21 via an input 41 to determine if PCI bus 21 is quiet. Once connector 34 and 36 are coupled and bus 21 is quiet, docking bridge 80 signals external bus master 31 to remove the QUIET REQUEST signal at QUIET REQUEST control line 57. Docking bridge 80 allows communication between buses 24 and 46 after the docking event is completed.

It is understood that, while the detailed drawings and specific examples given describe preferred exemplary embodiments of the present invention, they are for the purpose of illustration only. The apparatus and method of the invention are not limited to the precise details and conditions disclosed. For example, although a bus arbiter is shown coupled directly with the docking agent, the bus arbiter could communicate across the system bus, a communication link, bridges or through other components. In this application, devices are coupled when they are able to communicate signals without functionally destroying the meaning of the signals; intermediate structures located between the devices do not render them uncoupled. Also, although the system bus is shown, a sub-bus or secondary bus could be utilized. Although a portable computer is described, the system is appropriate for any mobile computer unit including personal digital assistants (PDAs). Further, single lines in the various drawings can represent multiple conductors. Various changes can be made to the details disclosed without departing from the spirit of the invention which is defined by the following claims.

We claim:

1. A portable computer in a dockable computer system for assuming at least two states, a docked state and an undocked state, said dockable computer system including a host station, said dockable computer system being in said docked state when said portable computer is operatively associated with said host station and being in said undocked state when said portable computer is physically separate from said host station, said portable computer comprising:

a computer bus;

a processor coupled to said computer bus;

a docking safe circuit communicating with said computer bus, said docking safe circuit including a dock input, said dock safe circuit driving said computer bus to a docking safe state in response to a DOCK signal on said dock input, wherein said portable computer includes a plurality of bidirectional terminals coupled to said computer bus, and said docking safe state includes setting said bidirectional terminals coupled to said computer bus to an output state before said dockable computer system attains said docked state or said undocked state, and wherein said host station includes a host bus said host station including a plurality bidirectional terminals coupled to said host bus, and said docking safe state includes setting said bidirectional terminals coupled to said host bus to an input state before said dockable computer system attains said docked state or said undocked state, and wherein said docking safe state includes quieting said computer bus before said dockable computer system attains said docked state or said undocked state; and a dock circuit communicating with said docking safe circuit, said dock circuit providing said DOCK signal in response to said dockable computer system changing states, said dock circuit sensing when said portable computer is physically separate from said host station and when said portable computer is operatively associated with said host station to generate said dock signal before said dockable computer system attains said docked state or said undocked state whereby said portable computer remains powered on without suspending operation of said processor during the transition from said undocked state to said docked state.

2. The portable computer of claim 1, wherein said portable computer includes a portable connector coupled to said computer bus and said host station includes a host connector coupled to a host bus, wherein said dockable computer system includes a ground reference station communicating with said portable computer and said host connector for ensuring said portable computer and said host station have a common ground reference in accordance with said docking safe state.

3. The portable computer of claim 2, wherein said host connector and said portable connector are configured so that said ground reference circuit communicates with said portable connector and said host connector engaged before first conductors associated with said host connector communicate with second conductors associated with said portable connector.

4. The portable computer of claim 1, wherein said dock safe circuit further comprises a bus isolation circuit having inputs coupled to said computer bus and outputs, said bus isolation circuit driving said outputs to a high impedance state in response to said DOCK signal.

5. The portable computer of claim 4, wherein said bus isolation circuit further quiets said computer bus in response to the dock signal.

6. The portable computer of claim 4 wherein said portable computer includes a connector bus between said bus isolation circuit and a connector, said bus isolation circuit being coupled between said connector bus and said computer bus, said connector bus being directly coupled to the connector.

7. The portable computer of claim 6 wherein the bus isolation circuit includes tri-state buffers and a signal keeper circuit including back-to-back inverters, the back-to-back inverters maintaining the current pin status on terminals coupled to said computer bus, wherein the back-back inverters can be overdriven by a plurality of devices coupled to the computer bus.

8. The portable computer of claim 1, wherein said computer bus is a PCI bus.

9. A method of docking or undocking a portable computer and a host station of a dockable computer system, said portable computer having a processing unit coupled to a computer bus and said host station having a host bus, said dockable computer system including a dock circuit for generating a DOCK signal in response to docking or undocking said portable computer, said computer bus being physically, and electrically coupled with said host bus when said portable computer is docked with said host station, said docking circuit sensing when said portable computer is about to be docked or undocked with said host station and determining when said portable computer is docking or undocking to generate said DOCK signal, said method comprising the steps of:

receiving said DOCK signal provided by said dock circuit;

driving said computer bus to a docking safe state in response to said dock signal by placing a plurality of bidirectional terminals coupled to said computer bus to an output state; and coupling or uncoupling said host bus and said computer bus, whereby said portable computer remains powered on without suspending operation of said processing unit when said portable computer is coupled with or uncoupled from said host station.

10. The method of claim 9, further comprising the step of:

driving said host bus to a second docking safe state by placing a plurality of bidirectional terminals coupled to the host bus to an input state.

11. The method of claim 10, wherein said second docking safe state includes quieting said host bus.

12. The method of claim 11, wherein said portable computer includes signal keepers for maintaining said computer bus in said docking safe state.

13. The method of claim 9, wherein said docking safe state includes quieting said computer bus.

14. A computer operated in an undocked state or a docked state with a station having a station bus, said computer including a computer bus, a connector bus and a computer connector coupled to said connector bus, said station including a station connector coupled to said station bus, said computer connector being coupled to said station connector when said computer is operable in said docked state, said computer connector being physically separate from said station connector when said computer is operable in said undocked state, said computer comprising:

a CPU for physical electrical communication with said computer bus; and a bus isolation circuit coupled between said computer bus and said connector bus, said connector bus being coupled between said bus isolation circuit and said computer connector, said bus isolation circuit isolating said computer bus to place said computer bus in a docking safe state when said computer changes states, said bus isolation circuit bringing said connector bus to a high impedance state to isolate said computer bus from said station bus in response to a dock signal indicating when said computer is about to change states, whereby said CPU remains powered on and said CPU remains operational when said computer changes states; and a dock sense circuit for sensing when said computer is about to change states and determines when said computer connector is about to be coupled to said station connector or when said computer connector is about to be disconnected from said station connector to generate said dock signal, said dock sense circuit generating said dock signal in response to said computer being about to change states.

15. The computer of claim 14, wherein said bus isolation circuit receives a notice signal indicating that said computer is about to change states and said bus isolation circuit drives said computer connector to a docking safe state in response to said notice signal.

16. The computer of claim 15, wherein said computer connector includes a ground pin interface.

17. The computer of claim 15, wherein said bus isolation circuit drives said computer connector to a high impedance state when said bus isolation circuit isolates said bus of said computer.

18. The computer of claim 14, wherein said bus isolation circuit includes FIFO buffers and state machines.

19. The computer of claim 14, wherein said bus isolation circuit is an in-line device coupled between said bus of said computer and said computer connector.

20. A dockable computer system comprising;
   a host computer station, including a processor and a station bus;
   a mobile computer unit including a unit bus, wherein said system is capable of residing in at least two distinct states, a docked state in which said unit is operatively associated with said station and an undocked state in which said unit is physically separate from said station;
   a docking safe circuit coupled to said unit bus, said docking safe circuit driving said unit bus to a docking safe state in response to a dock signal before said system changes from said undocked state to a docked state or from said docked state to said undocked state, said docking safe state including setting a plurality of bidirectional terminals coupled to said unit bus to an output state, setting a plurality of bidirectional terminals coupled to said station bus to an input state, setting the logic high signal level of said station bus to the logic high signal level of said unit bus, and referencing ground conductors on said station bus and the unit bus to the same ground potential, whereby said mobile computer unit remains powered on without suspending said processor when said mobile computer unit is docked with said host computer station; and
   a dock sense circuit for sensing when said dockable computer system is about to change states, said dock sense circuit determining when said unit is about to be operatively associated with said station or when said unit is about to be physically separate from said station to generate said dock signal in response to said dockable computer system being about to change states.

* * * * *